United States Patent
Lee et al.

(10) Patent No.: US 12,514,135 B2
(45) Date of Patent: Dec. 30, 2025

(54) SPIN-ORBIT TORQUE DEVICE ARRAY AND METHOD OF MANUFACTURING SPIN-ORBIT TORQUE DEVICE ARRAY

(71) Applicants: Hyundai Motor Company, Seoul (KR); Kia Corporation, Seoul (KR); Korea Advanced Institute of Science and Technology, Daejeon (KR)

(72) Inventors: Ji-Sung Lee, Suwon-si (KR); Joon-Hyun Kwon, Hwaseong-si (KR); Su-Jung Noh, Seoul (KR); Han-Saem Lee, Seoul (KR); Dae-Kyu Koh, Daejeon (KR); Byong-Guk Park, Daejeon (KR); Jaimin Kang, Daejeon (KR); Soogil Lee, Daejeon (KR)

(73) Assignees: Hyundai Motor Company, Seoul (KR); Kia Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 442 days.

(21) Appl. No.: 18/153,507

(22) Filed: Jan. 12, 2023

(65) Prior Publication Data

US 2024/0032442 A1 Jan. 25, 2024

(30) Foreign Application Priority Data

Jul. 20, 2022 (KR) .................. 10-2022-0089342

(51) Int. Cl.
*G11C 11/18* (2006.01)
*H10B 61/00* (2023.01)
*H10N 50/10* (2023.01)
*H10N 50/85* (2023.01)
*H10N 52/01* (2023.01)
*H10N 52/80* (2023.01)
*H10N 52/85* (2023.01)

(52) U.S. Cl.
CPC ............. *H10N 52/80* (2023.02); *H10B 61/00* (2023.02); *H10N 52/01* (2023.02); *H10N 52/85* (2023.02)

(58) Field of Classification Search
CPC . G11C 11/1675; G11C 11/161; G11C 11/695; G11C 11/18; G11C 11/1697; H10B 61/00; H04L 9/0866; H10N 50/01; H10N 50/10; H10N 50/85; H10N 52/80; H10N 52/01; H10N 52/85
See application file for complete search history.

(56) References Cited

U.S. PATENT DOCUMENTS

| 7,545,013 B2 | 6/2009 | Sugahara et al. |
| 10,127,956 B2 | 11/2018 | Lee et al. |
| 10,809,319 B2 | 10/2020 | Rhie et al. |

(Continued)

FOREIGN PATENT DOCUMENTS

| KR | 20160133821 A | 11/2016 |
| KR | 20170092300 A | 8/2017 |
| WO | 2004086625 A1 | 10/2004 |

*Primary Examiner* — Omar F Mojaddedi
(74) *Attorney, Agent, or Firm* — Slater Matsil, LLP

(57) ABSTRACT

An embodiment spin-orbit torque device array includes a plurality of single devices, each device including a non-magnetic layer, a magnetic layer bonded to the non-magnetic layer, and an upper layer bonded to the magnetic layer, wherein the upper layer includes oxide, and wherein a magnetization state of each of the single devices has only two states, the two states being an up state and a down state.

16 Claims, 11 Drawing Sheets

(56) References Cited

U.S. PATENT DOCUMENTS

| | | | |
|---|---|---|---|
| 2006/0114018 A1 | 6/2006 | Sugahara et al. | |
| 2010/0277971 A1* | 11/2010 | Slaughter | G11C 11/161 |
| | | | 365/158 |
| 2015/0200003 A1* | 7/2015 | Buhrman | H10N 52/80 |
| | | | 365/158 |
| 2016/0276006 A1* | 9/2016 | Ralph | H10N 50/10 |
| 2017/0178705 A1* | 6/2017 | Buhrman | G11C 11/161 |
| 2017/0316813 A1 | 11/2017 | Lee et al. | |
| 2018/0137904 A1 | 5/2018 | Mihajlovic et al. | |
| 2018/0151212 A1* | 5/2018 | Lim | G11C 11/1693 |
| 2019/0079147 A1 | 3/2019 | Rhie et al. | |
| 2020/0066968 A1 | 2/2020 | Park et al. | |
| 2021/0050510 A1* | 2/2021 | Cai | G11C 11/18 |

* cited by examiner

SPIN-ORBIT TORQUE DEVICE ARRAY AND METHOD OF MANUFACTURING SPIN-ORBIT TORQUE DEVICE ARRAY

CROSS-REFERENCE TO RELATED APPLICATIONS

This application claims the benefit of Korean Patent Application No. 10-2022-0089342, filed on Jul. 20, 2022, which application is hereby incorporated herein by reference.

TECHNICAL FIELD

The present disclosure relates to a magnetic substance device array using a spin-orbit torque and a method of manufacturing the same.

BACKGROUND

Ahead of the mass production of autonomous vehicles according to the development of information and communication technology such as Internet of Things (IoT), a security problem of an autonomous traveling system of the vehicle is emerging in a vehicle to everything (V2X) situation, and a failure to stably protect the autonomous traveling system from an external attack may cause a fatal threat to the lives of occupants or pedestrians.

In addition, there have been reported cases in which result values of security keys generated through machine learning or the like are predicted in conventional software-based security systems.

In order to respond thereto, hardware-based security solutions that go beyond the stability of the conventional software-based security solutions are recently starting to attract attention.

Recently, there has been reported a case in which a hardware security device is implemented by using a different switching current of a spin-orbit torque (SOT), which is a method of electrically controlling the vertical magnetization of a thin film of a magnetic substance, for each device.

This previous study suggests that when a pulse current having the same intensity is applied to all devices using a different SOT switching current for each device, the devices have a magnetic state between up and down, and this intermediate state may be used as a random factor of the security device randomly for each device.

Accordingly, by converting a Hall resistance value RH of the device into a digital value through an analog-to-digital converter (ADC), a range of analog values between up and down is divided at regular intervals to allocate digital bits in each space, and a digital bitmap is acquired by confirming a digital value and position of each device in the device array.

However, the intermediate state between up and down is likely to be changed at a magnetic field having an intensity much smaller than a coercive force of a material, and one of the important issues is to prevent information loss of the security device in applying the hardware security device.

The contents described in this section are to help the understanding of the background of embodiments of the present disclosure, and may include what is not previously known to those skilled in the art to which the present disclosure pertains.

SUMMARY

Embodiments of the present disclosure can solve problems in the art, and an embodiment of the present disclosure provides a spin-orbit torque device array, which may be driven with low power without an ADC using a spin-orbit torque, and a method of manufacturing the same.

A spin-orbit torque device array according to one embodiment of the present disclosure includes single devices including a non-magnetic layer, a magnetic layer bonded to the non-magnetic layer, and an upper layer bonded to the magnetic layer and made of oxide, wherein a magnetization state of each of the single devices has only two states of an up state and a down state.

Here, the magnetic layer is made of any one of CoFeB, CoFe, NiFe alloy, and Co.

In addition, the non-magnetic layer is made of any one of platinum (Pt) and tantalum (Ta).

Next, a method of manufacturing a spin-orbit torque device array according to one embodiment of the present disclosure includes acquiring a switching curve according to an applied current of a spin-orbit torque device array including single devices including a non-magnetic layer, a magnetic layer bonded to the non-magnetic layer, and an upper layer bonded to the magnetic layer and made of oxide, setting a pulse current for acquiring a security device pattern from a distribution of magnitudes of switching currents of the single devices by the switching curve, setting saturation currents from SOT switching curves acquired by applying the pulse current to the single devices, and saturating magnetization states of the single devices by applying the saturation currents to the single devices.

In addition, in the saturating of the magnetization states of the single devices, a magnetization state of each of the single devices has only two states of an up state and a down state.

In addition, the setting of the saturation currents sets currents having magnitudes required for saturating the magnetization states of the single devices from the SOT switching curve to magnitudes of the saturation currents.

Furthermore, the setting of the saturation currents includes confirming a sign of an anomalous Hall effect (AHE) of each of the single devices after applying the pulse current to the single devices.

In addition, in the setting of the saturation currents, a positive (+) current is set to a single device having a (+) sign of the anomalous Hall effect among the single devices, and a negative (−) current is set to a single device having a (−) sign of the anomalous Hall effect among the single devices.

In addition, the setting of the pulse current sets a median value among switching current values of the single devices from the distribution of the magnitudes of the switching currents to the pulse current.

Meanwhile, the method may further include applying the pulse current after initializing the magnetization state by applying the saturation currents to the single devices before the saturating of the magnetization state after the setting of the saturation currents.

In addition, the magnetic layer is made of any one of CoFeB, CoFe, NiFe alloy, and Co, and the non-magnetic layer is made of any one of platinum (Pt) and tantalum (Ta).

Embodiments of the present disclosure provide the technique of improving the resistance to the external magnetic field up to the value corresponding to the coercive force of the material by saturating the magnetic state of the single device configuring the physically unclonable function (PUF) device to the up state or the down state according to the sign of the anomalous Hall effect of each single device through the SOT.

In the conventional PUF device using the non-saturated magnetization state, the magnetization state (information of the PUF) can change at the magnetic field with the intensity smaller than the coercive force of the material because the magnetic domain is easily expanded by the external magnetic field.

According to the method proposed by embodiments of the present disclosure, the spin-orbit torque device array can be driven with lower power because the conventional device is given the characteristics of the digital output value, and the analog-to-digital converter (ADC) configured to convert the value of the anomalous Hall effect of each device into the digital bit is not required.

In addition, it is expected that the security device to which embodiments of the present disclosure are applied is likely to be applied to the SOT-MRAM by employing the CoFeB/MgO structure, and the sensing margin of the magnetic tunnel junction will greatly increase as the magnetization of the device is saturated.

DETAILED DESCRIPTION OF ILLUSTRATIVE EMBODIMENTS

In order to fully understand the present disclosure, the operational advantages of embodiments of the present disclosure, and the features achieved by the practice of embodiments of the present disclosure, reference should be made to the accompanying drawings showing preferred embodiments of the present disclosure and the contents described in the accompanying drawings.

In describing the preferred embodiments of the present disclosure, well-known techniques or repetitive descriptions that may unnecessarily obscure the gist of the present disclosure will be reduced or omitted.

Figure 1:
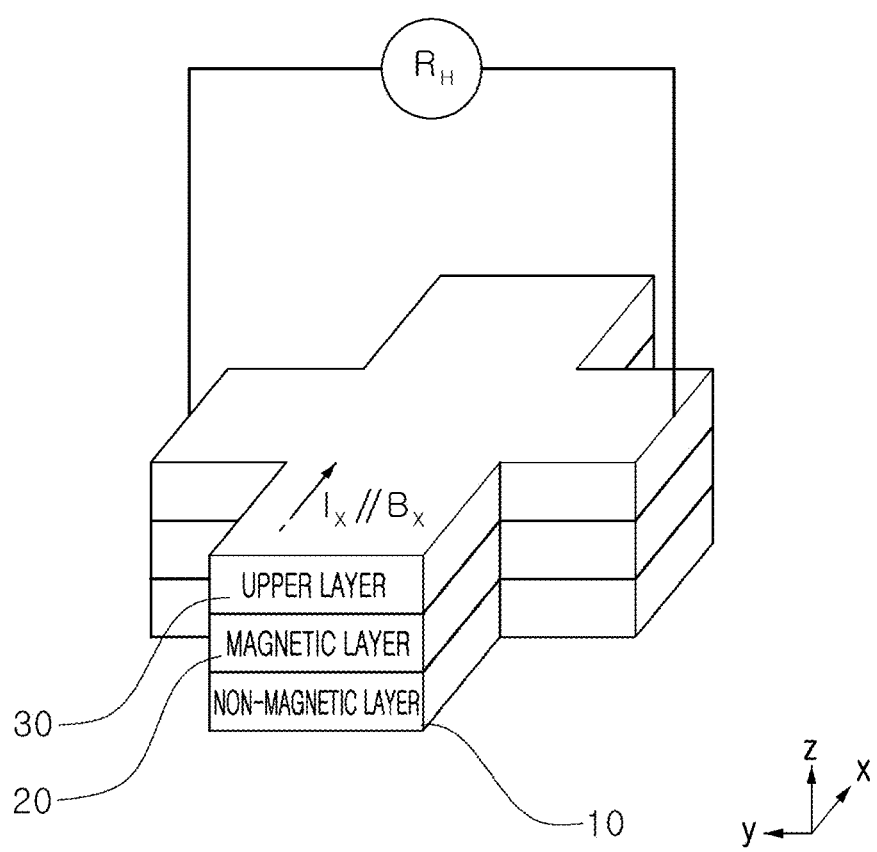
FIG. 1 schematically shows an example of a single device configuring a spin-orbit torque device array according to embodiments of the present disclosure.
Figure 2:
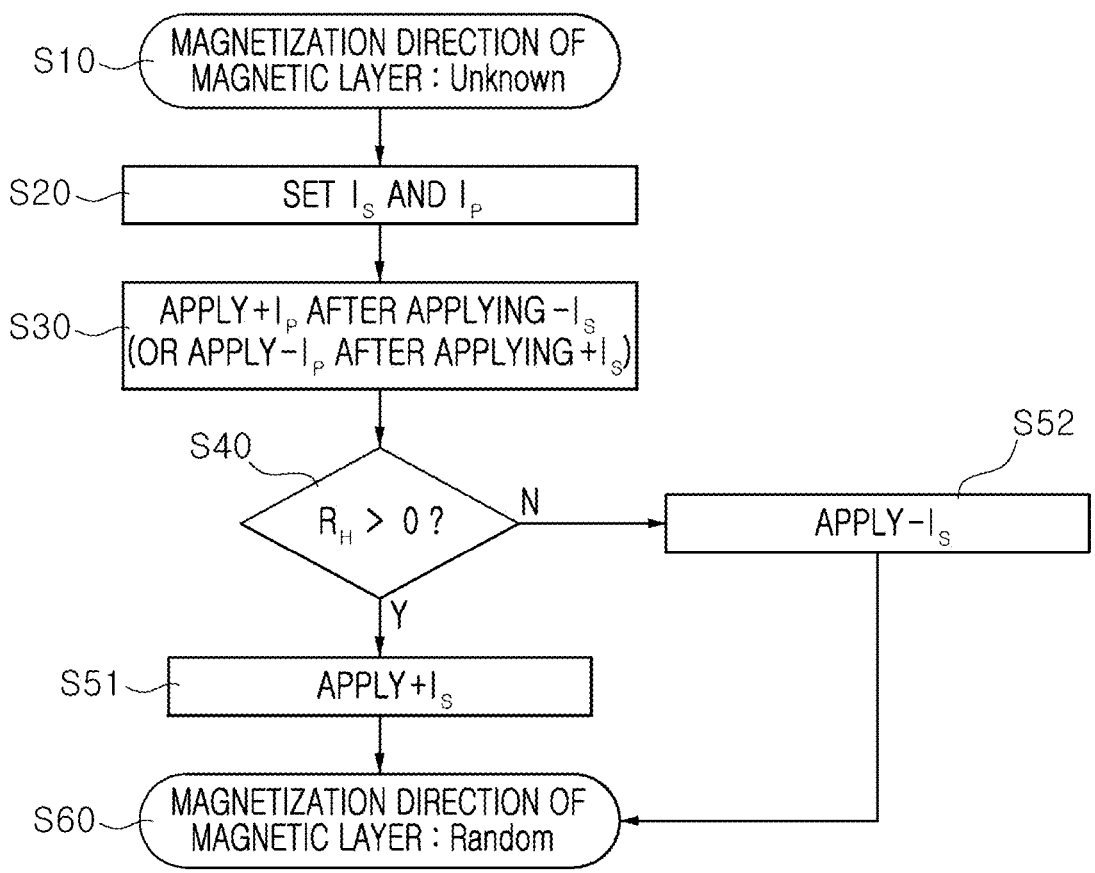
FIG. 2 schematically shows an example of a method of manufacturing the spin-orbit torque device array according to embodiments of the present disclosure.
Figure 3:
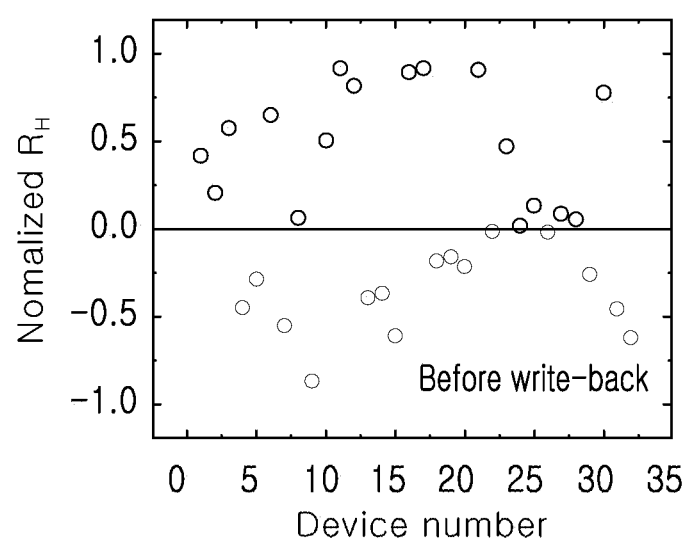
FIG. 3 shows a state before a magnetization saturation process according to embodiments of the present disclosure.
Figure 3:
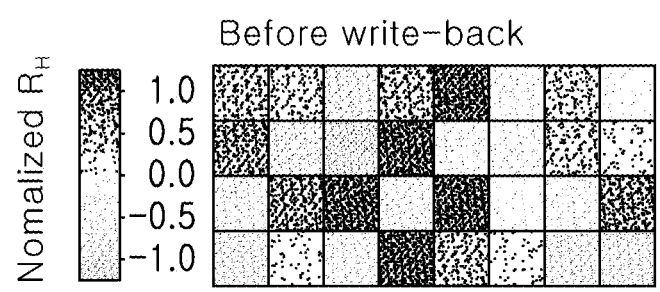
Figure 4:
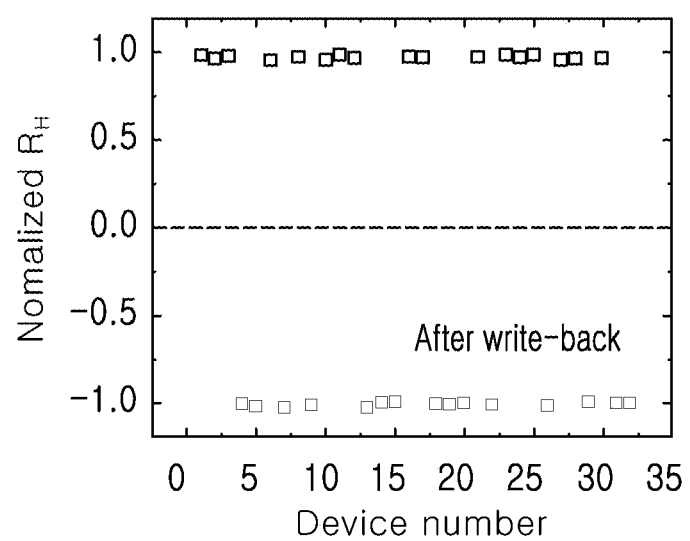
FIG. 4 shows a state after the magnetization saturation process according to embodiments of the present disclosure.
Figure 4:
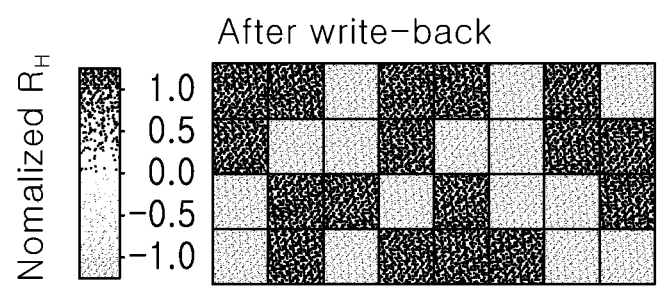

FIG. 1 schematically shows an example of a single device of a spin-orbit torque device array according to embodiments of the present disclosure, and FIG. 2 schematically shows an example of a method of manufacturing the spin-orbit torque device array according to embodiments of the present disclosure. In addition, FIG. 3 shows a state before the magnetization saturation process according to embodiments of the present disclosure, and FIG. 4 shows a state after the magnetization saturation process according to embodiments of the present disclosure.

Hereinafter, a spin-orbit torque device array and a method of manufacturing the same according to an embodiment of the present disclosure will be described with reference to FIGS. 1 to 4.

Among recent semiconductor devices, a magnetic memory device has ideal conditions as a memory device because the magnetic memory device has high speed, low operating voltage, and non-volatile characteristics.

The magnetic memory device has a magnetic tunnel junction structure in which two ferromagnetic materials are separated by an insulating layer. Accordingly, the magnetic memory device stores information with a magnetoresistance that varies depending on the relative magnetization directions of the two magnetic substances.

A magnetization direction of two magnetic layers may be controlled by a spin polarization current, which is called a spin transfer torque, in which the angular momentums of electrons are transmitted to magnetic moments to generate torques.

In order to control the magnetization direction with the spin transfer torque, the spin polarization current needs to pass through the magnetic material, but recently, there has been proposed a technique of implementing a magnetization reversal of the magnetic substance through the application of a horizontal current by placing a heavy metal that generates a spin current close to the magnetic substance, that is, a spin-orbit torque technique.

Embodiments of the present disclosure relate to a magnetic memory device of a physically unclonable function (PUF) that may be used in the security technology using the spin-orbit torque and the spin-orbit torque device array that may be driven with low power without the analog-to-digital converter (ADC).

As shown in FIG. 1, a single device of the spin-orbit torque device array according to embodiments of the present disclosure may be formed in a triple-layer structure in which a non-magnetic layer 10, a magnetic layer 20, and an upper layer 30 are laminated.

The non-magnetic layer 10 may be made of a non-magnetic metal such as Pt (platinum) or Ta (tantalum), and the magnetic layer 20 may be made of a ferromagnetic material such as CoFeB, CoFe, NiFe alloy, or Co.

In addition, for example, the upper layer 30 may be made of MgO oxide.

As shown, a vertical component of magnetization may be measured electrically through the AHE measurement of the device by manufacturing the single device in a shape of a cross-shaped Hall-bar in order to measure the AHE of the device.

Single devices having a Ta/CoFeB/MgO Hall-bar structure manufactured through the same process have slightly different SOT switching currents, and when a pulse current having the same intensity and an in-plane magnetic field are applied thereto, switching degrees are different for each device. Accordingly, a magnetization direction of the magnetic layer is in an unknown state as shown in S10 of FIG. 2.

According to embodiments of the present disclosure, digital characteristics are acquired by saturating the magnetization state of the device array in the state shown in FIG. 3 so that a state shown in FIG. 3 becomes a magnetization state shown in FIG. 4.

In other words, the digital characteristics are acquired by acquiring the SOT switching curves of the Hall-bar devices and applying a pulse current having a sufficient intensity capable of saturating the magnetization state of the device through the anomalous Hall resistance of the SOT device to saturate the magnetization state of the device.

Here, the magnetization state is saturated by applying a positive (+) current when a sign of the anomalous Hall resistance R H of each device is (+) and applying a negative (−) current when the sign of the anomalous Hall resistance RH of each device is (−).

The Hall resistance selection and magnetization saturation process is called write-back, so that the magnetization state has only two states of an up state or a down state.

Figure 5:
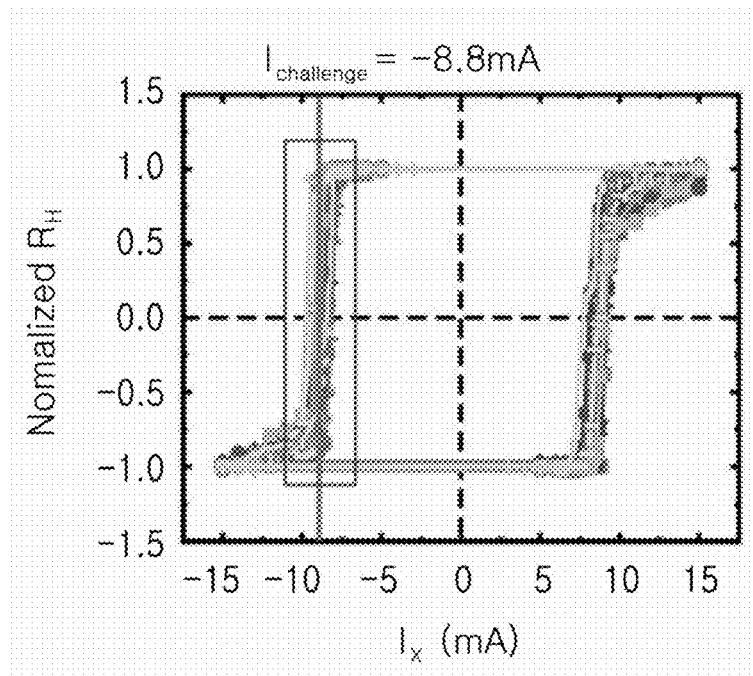
FIG. 5 shows an example of an SOT switching curve of the device array.
Figure 6:
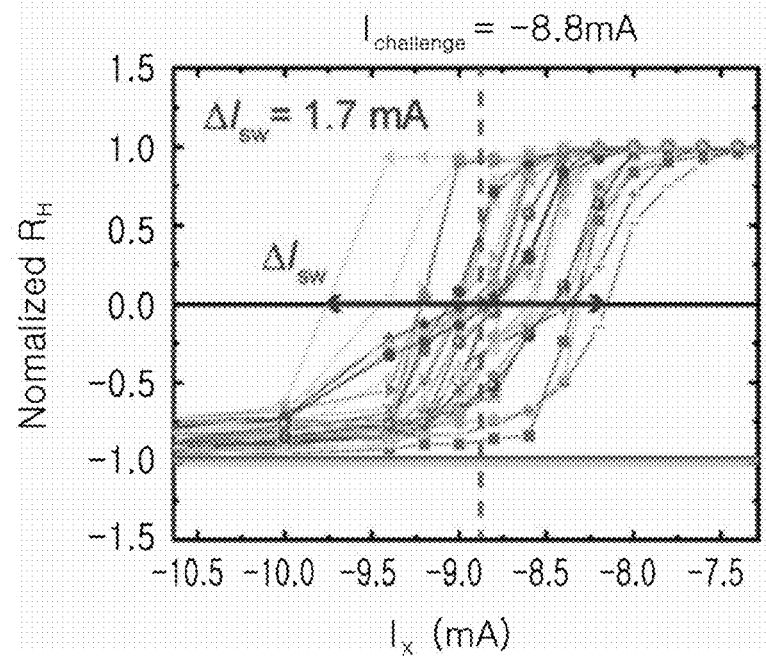
FIG. 6 shows a switching current distribution of the device array.

More specifically, as shown in FIGS. 5 and 6, for example, the magnitude of the switching current of the devices is acquired from the switching curve according to the current applied to the device array including 32 Hall-bar devices.

The switching current of the device means an intensity of a pulse current at a point where the Hall resistance value becomes zero on the switching curve.

In the example, a pulse current having a magnitude corresponding to a median value is selected among the switching current values of 32 devices.

It can be seen that a switching current of 16 devices corresponding to half of all devices is smaller than −8.8 mA, a switching current of the remaining 16 devices is greater than −8.8 mA, and a corresponding magnitude is set to a current $I_p$ for acquiring the Hall resistance distribution (S20).

Figure 7:
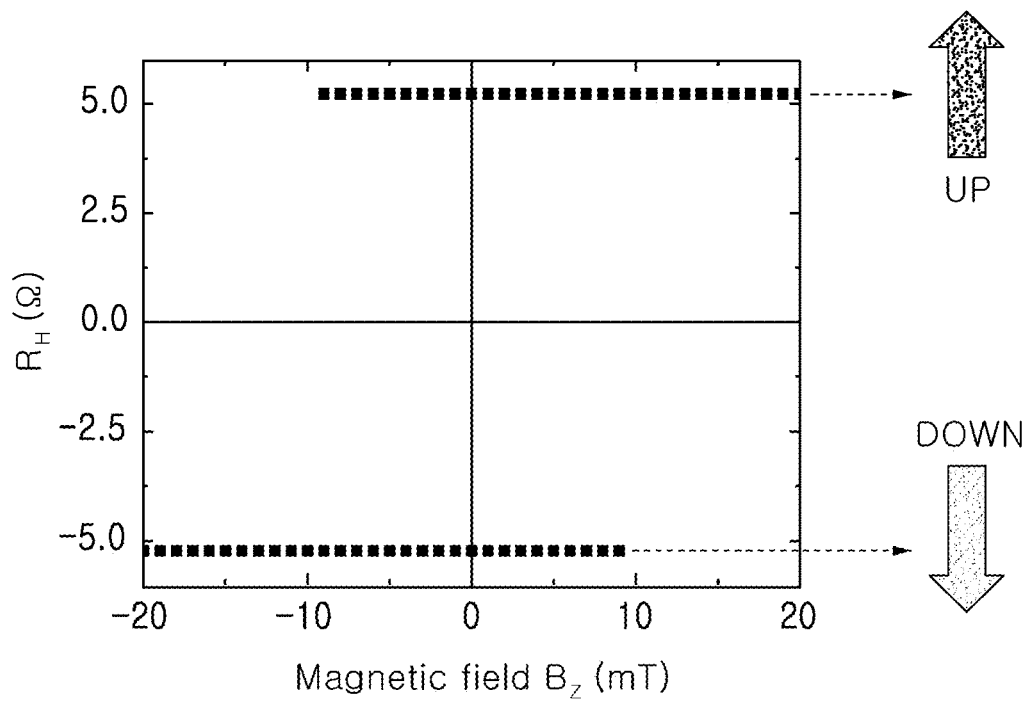
FIG. 7 shows signs and magnitudes of a Hall resistance when magnetization is saturated.

Next, referring to FIG. 7, it is possible to confirm the sign and magnitude of the Hall resistance when the magnetization is saturated from an anomalous Hall resistance $R_H$— vertical magnetic field $B_z$ hysteresis curve.

The magnitude and sign of the Hall resistance are indexes that may confirm the vertical magnetization state of the device. It can be seen that the Hall resistance of the device is +(−) 5Ω when all magnetizations are in the up (down) state.

Figure 8:
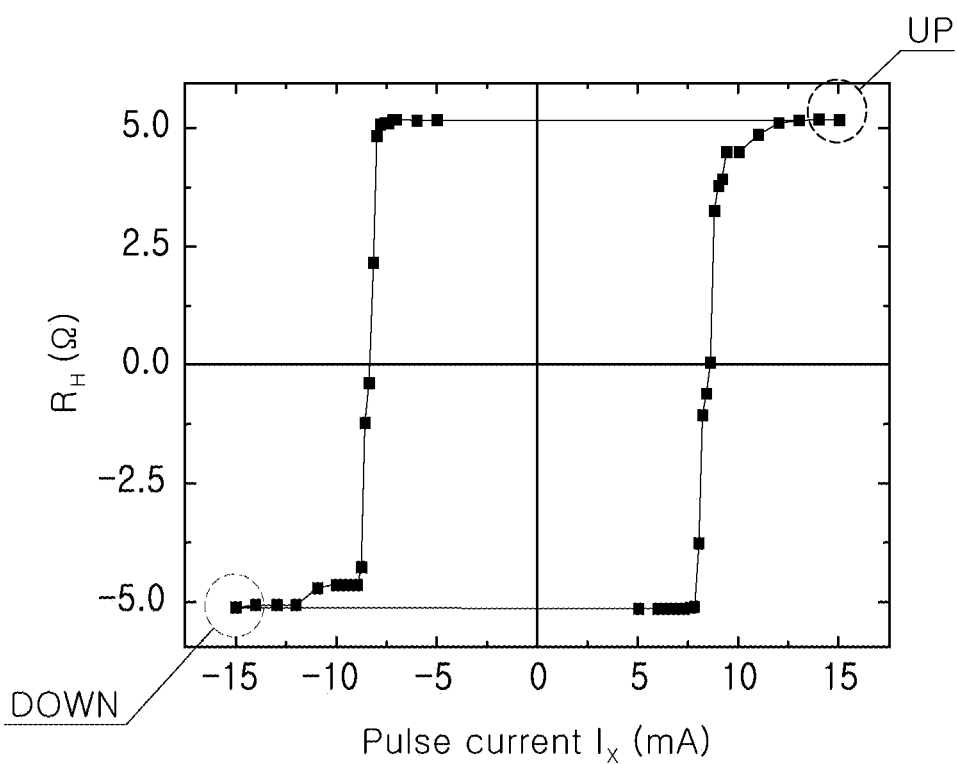
FIG. 8 shows an SOT switching curve showing the Hall resistance of the device according to an intensity of a pulse current applied under an in-plane magnetic field having a specific intensity.

A SOT switching curve in FIG. 8 is a graph showing the Hall resistance of the device according to the intensity of the pulse current applied under the in-plane magnetic field (x-axis direction) having the specific intensity.

In other words, it is possible to determine an intensity of a current $I_s$, that is, the saturation current required to saturate the magnetization state of the device from the SOT switching curve (S20).

In this embodiment, it can be confirmed that when an in-plane magnetic field of +10 mT and a pulse current of 15 mA required for SOT switching are applied, the magnetization has been saturated through the Hall resistance.

In other words, when the magnetization is saturated to the up state, the magnetization may be saturated by applying the pulse current of +15 mA and the in-plane magnetic field of 10 mT, and when the magnetization is saturated to the down state, the magnetization may be saturated by applying a pulse current of −15 mA and the in-plane magnetic field of 10 mT.

As described above, when $I_s$ and $I_p$ are determined (S20), by applying $+I_p$ after applying $-I_s$ or applying $-I_p$ after applying $+I_s$ (S30), the pulse current and in-plane magnetic field (10 mT) for acquiring a security device pattern are applied after the magnetization direction is initialized to the up state or the down state.

Then, the sign of the anomalous Hall resistance RH of the single devices is confirmed through the anomalous Hall effect (AHE) in which the vertical magnetization component may be confirmed (S40).

A device array saturated in a random magnetization direction of the magnetic layer is obtained (S60) by applying $+I_s$ to a device having a positive anomalous Hall resistance (S51) and applying $-I_s$ to a device having a negative anomalous Hall resistance (S52).

As described above, according to embodiments of the present disclosure, it is possible to manufacture the security device that may be driven with low power without the ADC by saturating the magnetization, and as a result, it is possible to improve the robustness of the security device against an external magnetic field.

Figure 9:
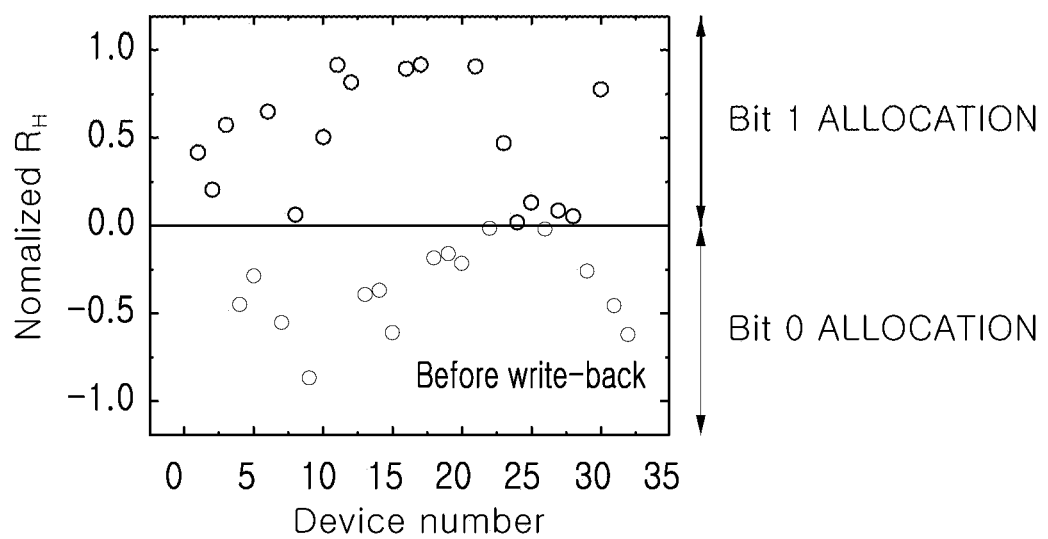
FIG. 9 shows a digital bit allocation concept according to embodiments of the present disclosure.

To verify this, a digital bit of 0 or 1 may be allocated to extract an index of the security device as shown in FIG. 9.

An evaluation index (entropy) of the security device is an evaluation index for a ratio of the number of different bits configuring the security device, and a case in which the number of bits 1 and the number of bits 0 are the same is expressed as 1, and a case in which all bits are the same is expressed as 0.

Figure 10:
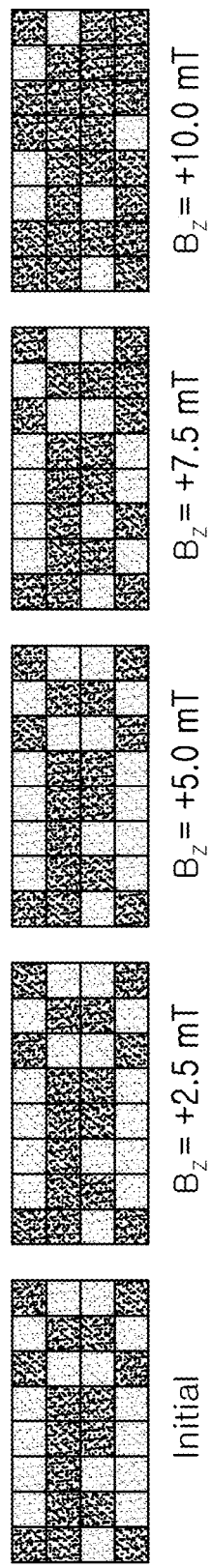
FIG. 10 shows a magnetization state after an external magnetic field is exposed before the magnetization saturation process.
Figure 11:
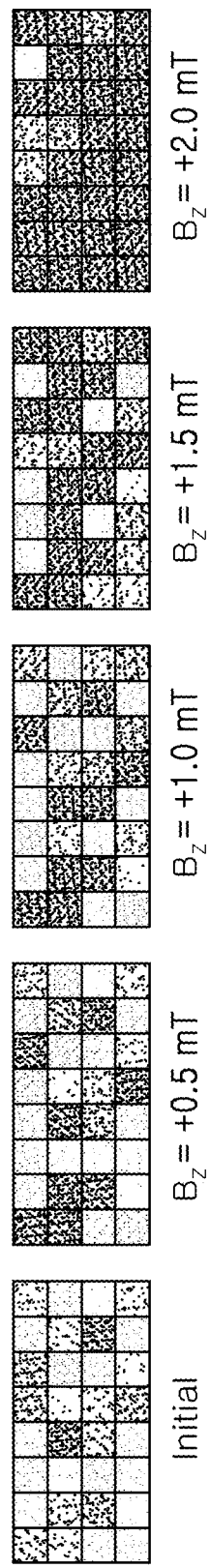
FIG. 11 shows a magnetization state after the external magnetic field is exposed after the magnetization saturation process according to embodiments of the present disclosure.

FIG. 10 shows a state according to an intensity of a magnetic field before write-back according to embodiments of the present disclosure, and FIG. 11 shows a state according to an intensity of a magnetic field after write-back.

Figure 12:
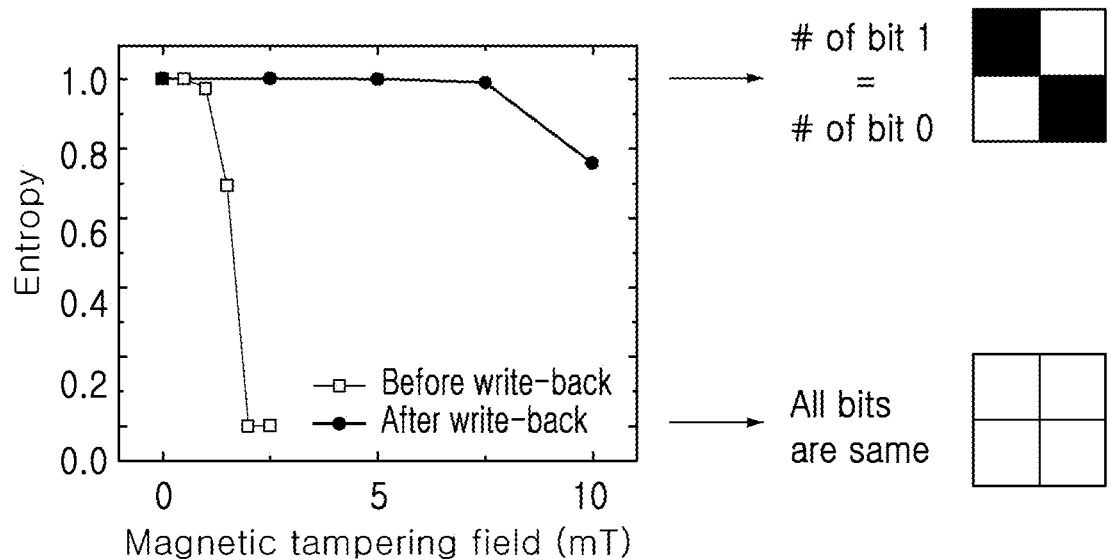
FIG. 12 shows an entropy change between the two magnetization states.

As the comparison result, it can be seen that the evaluation index (entropy) of the security device appears as shown in FIG. 12. Accordingly, it can be confirmed that the intensity of the magnetic field in which the index of the security device decreases after write-back is increased.

Figure 13:
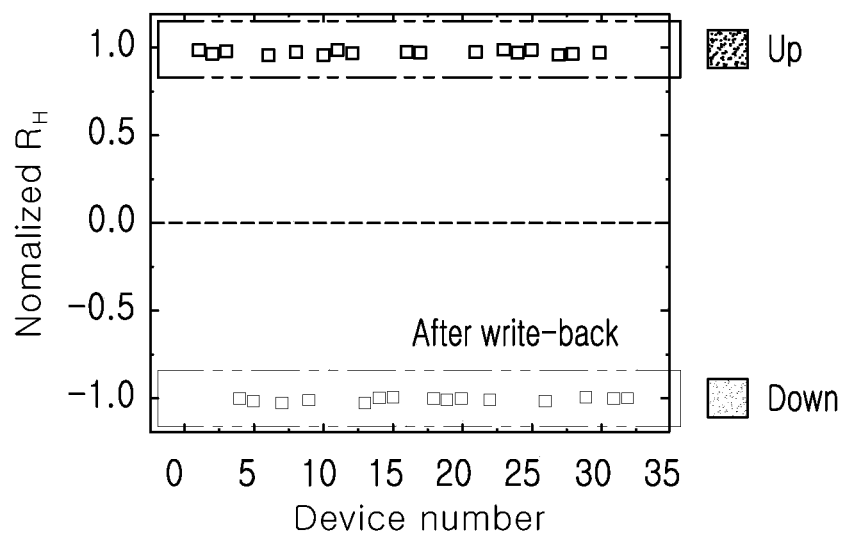
FIG. 13 shows a state after the magnetization saturation process according to embodiments of the present disclosure.

In order to generate the bit, the conversion by ADC is conventionally required due to the magnetic state between up and down, but the magnetic state has two states of up or down as shown in FIG. 13 after write-back according to embodiments of the present disclosure.

Accordingly, the PUF device according to embodiments of the present disclosure may have the characteristics of a digital signal, and does not require the ADC, and thus may be driven with low power.

Figure 14:
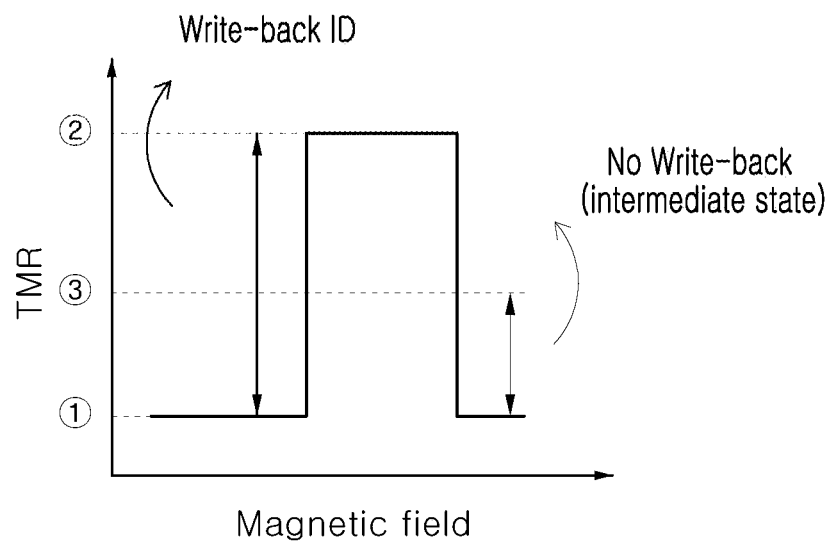
FIG. 14 shows a tunnel magnetoresistance ratio (TMR) according to the magnetic field.
Figure 15:
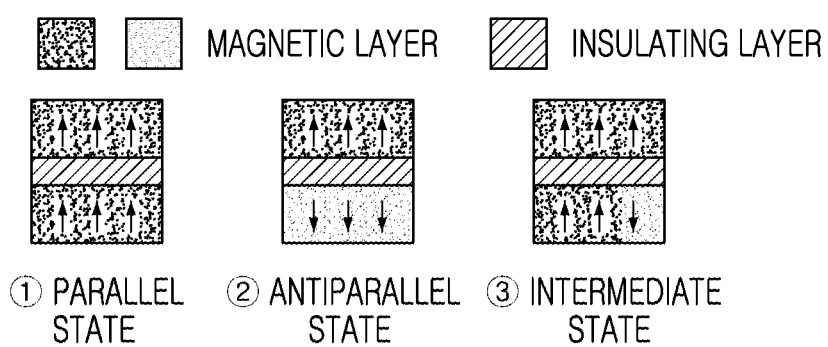
FIG. 15 shows a magnetization state of a magnetic tunnel junction in a corresponding state.

In addition, as shown in FIGS. 14 and 15, the tunnel magnetoresistance (TMR) of the device having an intermediate magnetic state between up and down is smaller than a maximum TMR of the magnetic tunnel junction (MTJ).

According to embodiments of the present disclosure, it can be seen that by saturating the magnetic domain of the magnetic layer through write-back, the device includes devices in a parallel state (①) and an antiparallel state (②) so that the maximum TMR may be used, and the TMR is greater than that in the intermediate state (③), so that it is easy to distinguish the magnetic state (to improve a sensing margin).

The present disclosure has been described above with reference to the exemplary embodiments, but is not limited to the described embodiments, and it is apparent to those skilled in the art that the present disclosure may be variously modified and changed without departing from the spirit and scope of the present disclosure. Accordingly, these modified examples or changed examples should belong to the claims of the present disclosure, and the scope of the present disclosure should be construed based on the appended claims.

What is claimed is:

1. A method of manufacturing a spin-orbit torque device array, the method comprising:
   acquiring a switching curve according to an applied current of the spin-orbit torque device array comprising a plurality of single devices, wherein each of the single devices comprises a non-magnetic layer, a magnetic layer bonded to the non-magnetic layer, and an upper layer bonded to the magnetic layer, and wherein the upper layer comprises oxide;
   setting a pulse current for acquiring a security device pattern from a distribution of magnitudes of switching currents of the single devices based on the switching curve;
   setting saturation currents from spin-orbit torque (SOT) switching curves acquired by applying the pulse current to the single devices; and
   saturating magnetization states of the single devices by applying the saturation currents to the single devices.

2. The method of claim 1, wherein in saturating the magnetization states of the single devices, the magnetization states of each of the single devices have only two states, the two states being an up state and a down state.

3. The method of claim 2, wherein setting the saturation currents comprises setting currents having magnitudes required for saturating the magnetization states of the single devices from the SOT switching curve to magnitudes of the saturation currents.

4. The method of claim 3, wherein setting the saturation currents comprises confirming a sign of an anomalous Hall effect (AHE) of each of the single devices after applying the pulse current to the single devices.

5. The method of claim 4, wherein in setting the saturation currents, a positive (+) current is set to a single device having a (+) sign of the anomalous Hall effect among the single devices, and a negative (−) current is set to a single device having a (−) sign of the anomalous Hall effect among the single devices.

6. The method of claim 5, wherein setting the pulse current comprises setting a median value among switching current values of the single devices from a distribution of the magnitudes of the switching currents to the pulse current.

7. The method of claim 6, further comprising applying the pulse current after initializing the magnetization states by applying the saturation currents to the single devices before saturating the magnetization states after setting the saturation currents.

8. The method of claim 6, wherein the magnetic layer comprises CoFeB, CoFe, NiFe alloy, or Co.

9. The method of claim 8, wherein the non-magnetic layer comprises Pt (platinum) or Ta (tantalum).

10. A method of manufacturing a spin-orbit torque device array, the method comprising:
    providing a plurality of single devices, wherein each of the single devices comprises a non-magnetic layer comprising Pt (platinum) or Ta (tantalum), a magnetic layer comprising CoFeB, CoFe, NiFe alloy, or Co bonded to the non-magnetic layer, and an upper layer comprising oxide bonded to the magnetic layer;
    acquiring a switching curve according to an applied current of the spin-orbit torque device array;
    setting a pulse current for acquiring a security device pattern from a distribution of magnitudes of switching currents of the single devices based on the switching curve;
    setting saturation currents from spin-orbit torque (SOT) switching curves acquired by applying the pulse current to the single devices; and
    saturating magnetization states of the single devices by applying the saturation currents to the single devices.

11. The method of claim 10, wherein in saturating the magnetization states of the single devices, the magnetization states of each of the single devices have only two states, the two states being an up state and a down state.

12. The method of claim 11, wherein setting the saturation currents comprises setting currents having magnitudes required for saturating the magnetization states of the single devices from the SOT switching curve to magnitudes of the saturation currents.

13. The method of claim 12, wherein setting the saturation currents comprises confirming a sign of an anomalous Hall effect (AHE) of each of the single devices after applying the pulse current to the single devices.

14. The method of claim 13, wherein in setting the saturation currents, a positive (+) current is set to a single device having a (+) sign of the anomalous Hall effect among the single devices, and a negative (−) current is set to a single device having a (−) sign of the anomalous Hall effect among the single devices.

15. The method of claim 14, wherein setting the pulse current comprises setting a median value among switching current values of the single devices from a distribution of the magnitudes of the switching currents to the pulse current.

16. The method of claim 15, further comprising applying the pulse current after initializing the magnetization states by applying the saturation currents to the single devices before saturating the magnetization states after setting the saturation currents.

* * * * *